May 26, 1953 B. LIEBOWITZ 2,639,843
METHOD AND APPARATUS FOR THE MANUFACTURE OF COLLARS
Filed Jan. 24, 1950 3 Sheets-Sheet 2
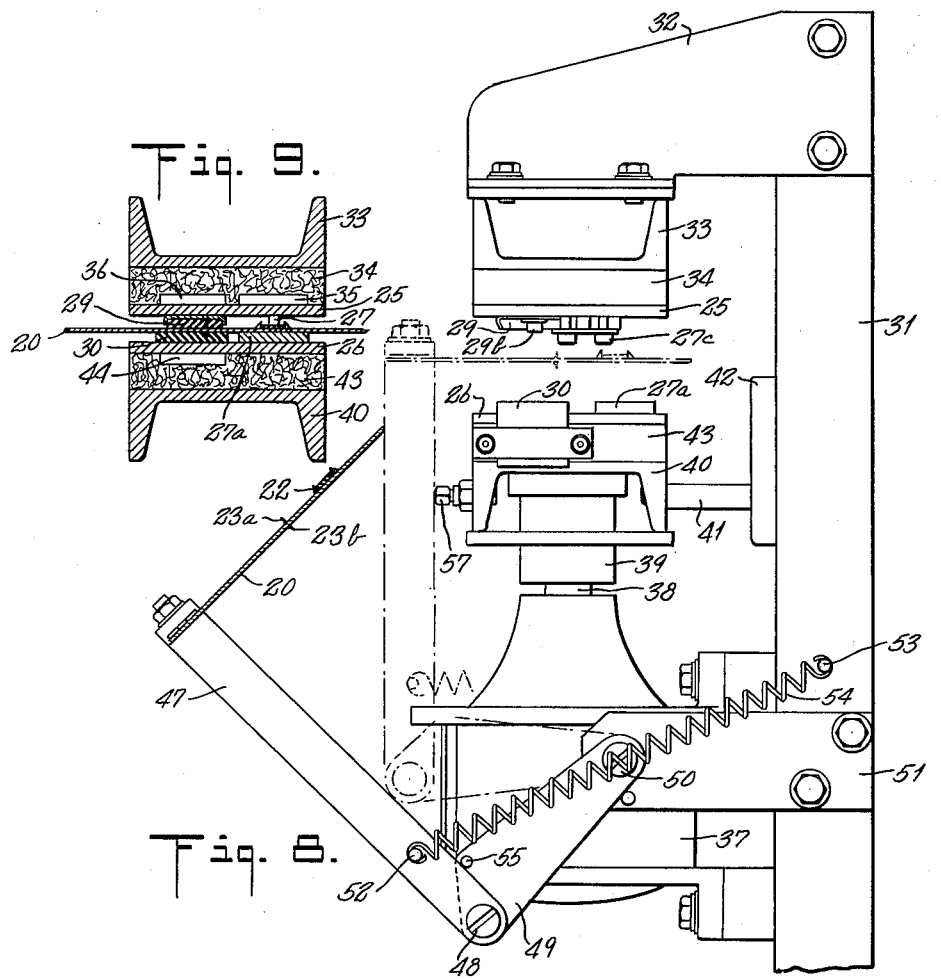
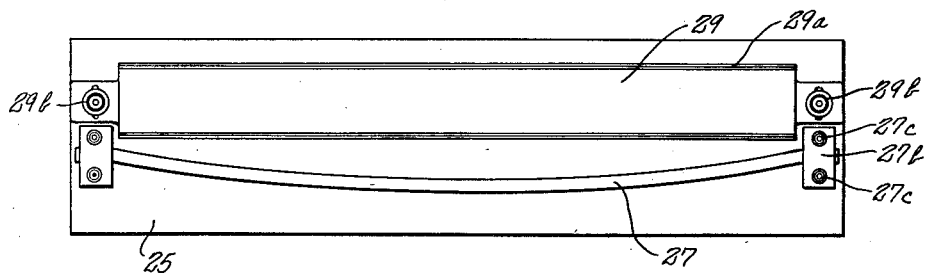
INVENTOR.
BENJAMIN LIEBOWITZ
BY Kenyon & Kenyon
ATTORNEYS

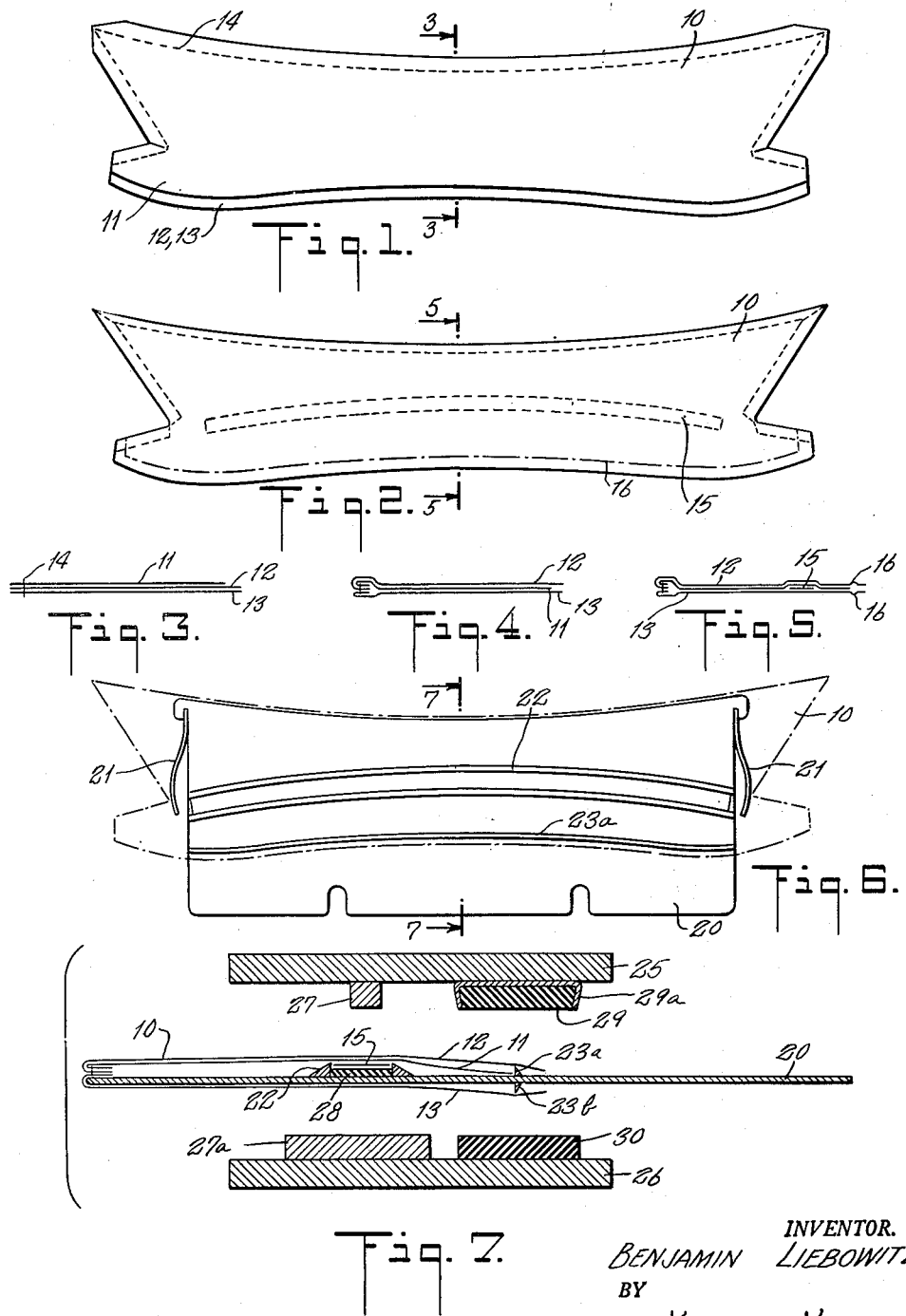

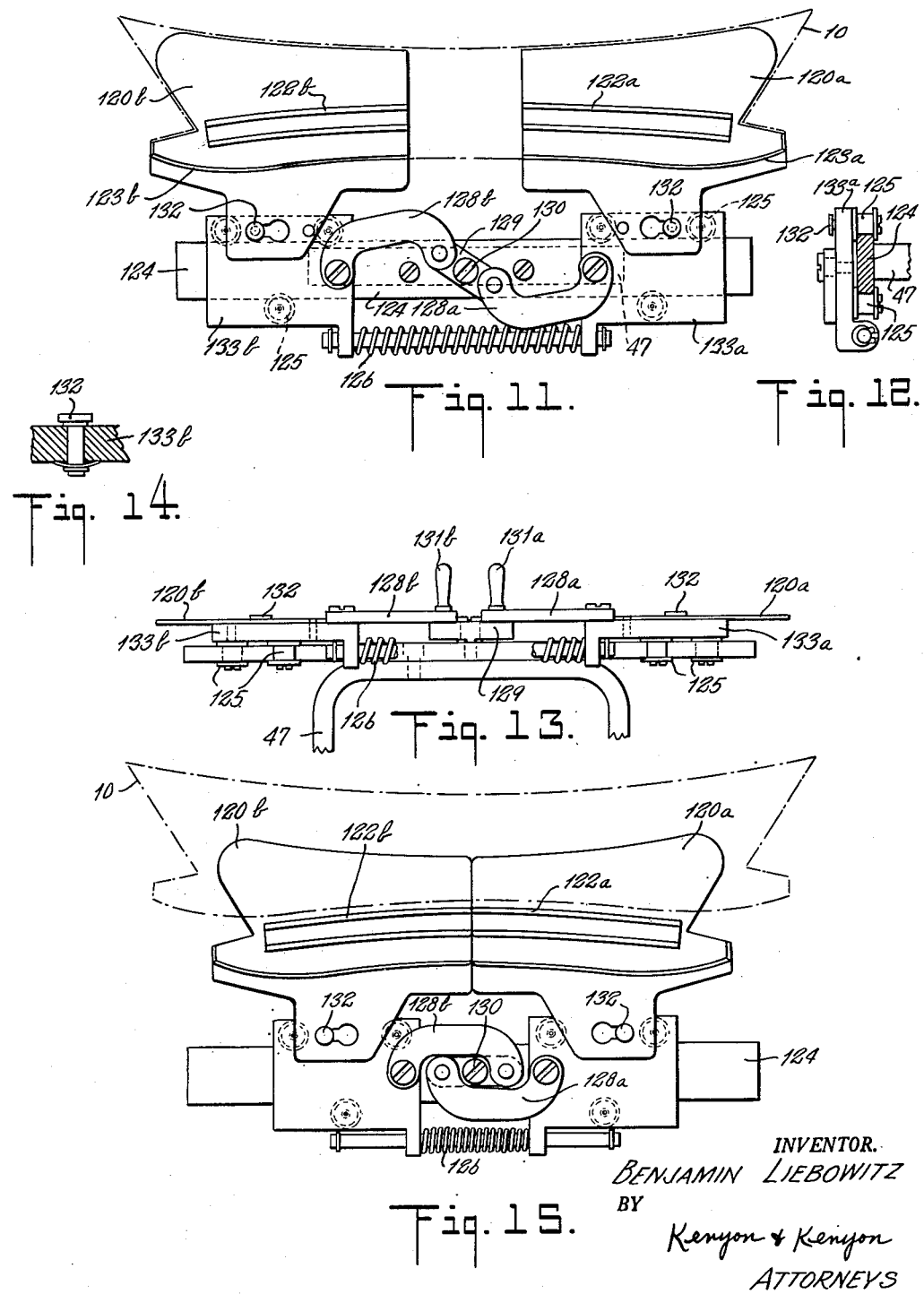

Patented May 26, 1953

2,639,843

UNITED STATES PATENT OFFICE 2,639,843

METHOD AND APPARATUS FOR THE MANUFACTURE OF COLLARS

Benjamin Liebowitz, Lewisboro, N. Y., assignor to Trubenizing Process Corporation, New York, N. Y., a corporation of New York Application January 24, 1950, Serial No. 140,246

17 Claims. (Cl. 223—2)

This invention relates to the manufacture of articles of apparel, particularly collars, and is especially applicable to the manufacture of one-piece collars.

The essential elements of a collar are the band portion and the collar top portion. The collar top portion is also frequently referred to as the cape portion or the foldover portion of the collar. In a one-piece collar the collar band and collar top portions are cut in one piece.

In my copending application Serial No. 79,758 filed March 5, 1949 for Method and Apparatus for Making Collars or the Like I have pointed out that collars are generally manufactured from three plies of fabric which are referred to herein and in my aforesaid application as the "face ply," the "lining ply" and the "back ply"; and that the generally accepted method of making collars is the two-piece method. According to the two-piece method the plies for the band portion and the plies for the collar top portion are cut separately, and the plies for the collar band and for the collar top are subsequently joined by stitching at a seam extending along the foldline between band and collar top portions of the finished collar. At this seam there are nine plies of fabric, i. e., the three single plies of the collar top and the three plies of the collar band doubled over to hide their raw edges.

In my aforesaid copending application I have also pointed out that the bulky seam between the collar band and collar top portion of conventional two-piece collars frequently is uncomfortable and that the high stitching tension which is required occasions serious difficulties due to the tendency of the stitching to shrink the collar during laundering and due to variations in the shrinkage resulting from different laundering methods. I also stated in my aforesaid copending application that attempts have previously been made to eliminate the bulky seam incident to conventional two-piece collars by cutting the fabric plies constituting the collar to the shape of the whole collar instead of cutting the collar top and collar band portions separately, thus affording a one-piece collar. However, except for "sport" collars, where high precision is not demanded, such previous attempts have had little success because manufacturing tolerances have been too large to allow adequate precision in the finished article. Moreover, such collars of the one piece variety are subject to serious objection in that there is nothing which serves the purpose of the seam of a two-piece collar for determining where the foldline is to occur upon laundering the collar, with the result that it is extremely difficult after laundering to locate the foldline of a one piece collar in proper relation to the peripheral contours of the collar.

In my aforesaid copending application I also pointed out that both one-piece three-ply collars and the tops of conventional two-piece three-ply collars are normally made by a method called "run and turn," which consists in superimposing the three plies with the face ply in the middle, "running," i. e., stitching around three sides of the outline required for the finished collar and thereafter "turning" the assembly inside out, thus bringing the face ply to the outside and the lining ply inside. During turning the plies hinge approximately around the running stitch.

In my aforesaid copending application I have disclosed method and apparatus which is particularly applicable to the running and turning method of collar manufacture whereby the collar contours are accurately predetermined and whereby in the case of collars of the one piece variety foldline-forming means is accurately located in the collar so as to be in predetermined spaced relationship to the collar contours, these operations being carried on at an early stage, and the resulting relationship being maintained throughout the subsequent manufacturing stages.

It is an object of this invention to provide improved method and apparatus whereby, as compared with the method and apparatus which I have disclosed in my aforesaid copending application, the location of the foldline-forming means with respect to the finished contours is accomplished and determined at a later stage, viz., after the collar has been run and turned.

The method and apparatus of my present invention have the advantage of effecting some saving in apparatus cost and in cost of operation by enabling the first stitching operation to be performed in its entirety without interruption for the creasing and other operations that are incident to the use of the method and apparatus of my aforesaid copending application and by enabling collars to be turned immediately after the first stitching operation, all in accordance with customary practice. It must be emphasized, however, that the practice of my present invention involves a sacrifice of some of the precision that can be regularly attained by the use of the method and apparatus of my aforesaid application. However, there are some circumstances where the loss of precision is not so much of a disadvantage as to offset the gain in manufacturing convenience and cost.

The nature of my present invention will be better understood from the following exemplary description thereof in connection with the accompanying drawings, wherein:

Fig. 1 is a plan view of the plies of a collar blank stitched together by the running operation;

Fig. 2 is a plan view of a collar after it has been turned, with the foldline-forming means indicated in position;

Fig. 3 is a cross-section on the line 3—3 of Fig. 1 showing the arrangement of the plies in the collar blank as run;

Fig. 4 is a cross-section corresponding to Fig. 3 after the collar has been turned inside out;

Fig. 5 is a cross-section on the line 5—5 of Fig. 2 with the foldline-forming means in place in the turned collar;

Fig. 6 is a plan view of a templet adapted to receive the turned collar for the purposes of applying the foldline-forming means and creasing the open edge of the collar;

Fig. 7 is a cross-sectional view on line 7—7 of Fig. 6 showing the collar in position on the templet of Fig. 6 when the templet is positioned between appropriate pressing members for applying the foldline-forming means, and for forming a crease along the lower edge of the band portion of the collar;

Fig. 8 is a side elevation of a machine or press adapted to perform the operation involved;

Fig. 9 is a fragmentary cross-section corresponding to Fig. 8 showing the press in operating position;

Fig. 10 is a plan view from underneath of the upper platen of the press;

Fig. 11 is a plan view of a modification showing a collapsible templet for receiving the turned collar;

Fig. 12 is a fragmentary side elevation of the modification of Fig. 11;

Fig. 13 is a front elevation of the modification of Fig. 11;

Fig. 14 is a fragmentary view partly in cross-section showing the mechanism of attaching the templet to the collapsing mechanism; and Fig. 15 is the same view as Fig. 11 but with the templet in collapsed position.

Referring to the drawings, 10 represents a run blank for a one piece collar before turning. It consists of a lining ply 11, a face ply 12 and a back ply 13, as shown in Fig. 3. The plies are held together by the running stitch 14. It is preferred to leave the extreme ends of the bands unrun. After the collar has been turned inside out, the positions of the plies are as indicated in Fig. 4 with the face ply 12 now uppermost. The appearance of the collar after the turning operation is shown in Fig. 2, in which the dotted line parallel to the contour represents the raw edges of material turned in at the peripheral seam. In this figure the part indicated by the dotted line 15 is the foldline-forming means. The dot and dash line indicated by 16 is a crease as will be subsequently explained.

20 is a templet (see especially Figs. 6 and 7) which is adapted to receive the turned collar. It will be noticed that the ends of the templet do not conform with the points of the collar but are made straight. The purpose of this is to enable the collar to be slipped on and off the templet without requiring the templet to be collapsed. However, provision should be made for the fact that collars made in this way will vary appreciably in length, easily as much as plus or minus $\frac{1}{16}$ of an inch from the intended length. To center the collar on the templet I have provided springs at the end thereof indicated by 21. These springs exert a gentle pressure on the ends of the run and turned collar at the crotch and thereby center the collar on the templet.

In my aforesaid copending application I have disclosed various foldline-forming means which may be included in a collar and which in the finished collar provides discontinuity of stiffness along the foldline between the band portion and the collar top portion of a one piece collar so that when the collar is laundered it will automatically and naturally fold over along the desired foldline in predetermined spaced relation to the peripheral contours of the collar. One such foldline-forming means which is adapted for use either in the manufacture of a soft collar or a collar of the fused type is a tape adapted for incorporation in the collar band of a one piece collar with one margin immediately adjacent the desired location of the foldline so that in the finished collar there will be discontinuity of stiffness at the foldline of the collar as determined by the margin of the tape. In order to facilitate the attachment of the tape in the desired location the tape ordinarily carries activatable adhesive, e. g., in the form of yarns woven into the tape or in the form of a coating applied thereto. The adhesive carried by the tape is preferably plasticized so that it can be activated more readily. The adhesive carried by the tape enables it to become "fused" to the ply or plies in contact therewith, thus establishing an abrupt change in stiffness along the collar foldline.

For purposes of illustration the templet 20 is shown with an applicator or holder 22 into which a tape or the equivalent of the character above referred to can be placed. In Fig. 7 the templet 20 with the tapeholder 22 attached thereto is shown with the plies 11, 12 and 13 of the turned collar 10 slipped over said templet. It will be seen from Figs. 6 and 7 how the collar is positioned on the templet in such a way that the foldline-forming means, i. e., the tape, is located in predetermined spaced relationship with respect to the upper edge of the collar top portion of the collar 10.

Now it is very desirable that the collarsetting edge of the band portion of the collar 10 shall also be accurately determined with respect to the foldline-forming means. According to the illustrative embodiment shown this determination of the lower edge of the band portion is accomplished by means of the creasing edges shown at 23a and 23b (see particularly Fig. 7). These creasing edges are attached to the templet, e. g. by hard solder and hence when the collar is located on the templet after the foldline-forming tape has been inserted into the tapeholder 22, they will crease the bottom edge of the band portion thereby determining the finished collarsetting edge of the collar band portion with a relatively high degree of precision. When the collar is attached to the shirt, e. g., the stitching and turning is performed in accordance with the creases made at 16 (Fig. 5) by the creasing edges 23a and 23b. In Fig. 7 the templet and its associated parts with the collar slipped over it in gauged position is shown located between the upper platen 25 of an upper pressing head and a lower platen 26 of a lower pressing head. The upper platen 25 has projecting downwardly from it a narrow member 27 which is designed to cooperate with the tapeholder 22. At the bottom of the tapeholder 22 is a strip 28 of rubber or other yieldable resilient material. When the platens 25 and 26 are brought together the member 27 presses the tape 15 against the rubber strip 28, and the pressure, together with the application of heat, "fuses" the tape 15 to the lining ply 11. This fusion need be only temporary; the tape 15 may be more permanently secured later, using stitches if desired. The upper platen 25 also carries an elongated rubber strip 29 which cooperates with a similar strip 30 on the lower platen 26 to squeeze the plies of fabric against the creasing edges 23a and 23b respectively to form the creases shown at 16 of Fig. 5. Again heat is used to make a better and more enduring crease.

Fig. 8 is a side elevation of a machine adapted to carry out the functions required of the parts indicated in Fig. 7. A frame member 31 carries an upper bracket 32 to which is attached a channel member 33 that carries an insulating block 34 recessed to receive electrical heating elements 35 and 36 which are retained in place by the upper platen 25. The frame member 31 also carries an air cylinder 37 on whose piston rod 38 is a flanged member 39 to which is welded a channel member 40. The channel member 40 carries a pin 41 whose outer end rides in a rectangular groove in a block 42 mounted on frame 31. By means of the parts 41 and 42 the channel member 40 is prevented from rotating as it is moved up and down by the air pressure in cylinder 37. A slab of insulating material 43 is carried on top of the channel member 40, and this insulating block is recessed to receive an electrical heating element 44. On top of the insulation 43 is the lower platen 26 with the rubber member 30 mounted thereon. To receive the pressure exerted by the strip 27 an elongated bar 27a is employed which is carried on the lower platen 26.

The templet 20 and its associated holder 22 and creasing edges 23a and 23b are shown in Fig. 8 by solid lines in position ready to receive the collar. The templet is carried by a U-shaped arm 47 (see also Fig. 13) and the following description of the mounting of the U-shaped arm is applicable to each end thereof. The U-shaped arm is pivoted at 48 to arm 49 which is turn is pivoted at 50 to bracket 51 carried on the frame 31. The U-shaped arm carries a pin 52 and the frame carries a pin 53. The spring 54 is stretched between these two pins but in the position shown by the solid lines in Fig. 8 the spring does not move the arm 47, first because its line of action passes through the center of the pivot 50, and secondly because a pin 55 extending from the arm 49 prevents the arm 47 from rotating about the pivot 48. After the collar has been applied to the templet when it is in the position shown by the solid lines in the Fig. 8, the whole assembly is rotated around the pivot 50 so as to move the templet into the position shown by the dotted lines in Fig. 8, i. e., between the platens 25, 26. When the arm 47 once begins to turn to the right around pivot 50 the line of action of the spring 54 will rise above the pivot 50 so that the spring 54 will pull the whole assembly into the dotted position. During all of this motion there is no turning around the pivot 48 because the spring tension due to the spring 54 is constantly holding the arm 47 against the pin 55.

After the templet has been moved into the position shown by the dotted lines in Fig. 8 air is admitted from a source not shown into the cylinder 37 whose piston thereupon carries upward all the parts mounted on the casting 39 so as to force the same against the parts carried by the upper platen 25. In the course of this action the templet is carried upward by the motion of the lower platen so as to contact the parts on the upper platen 25. The mechanism shown allows this vertical travel of the templet by the permitted rocking movement around the pivot 48. The inward travel of the arm 47 and of the templet carried by it is limited by the adjustable screw 57 carried by the channel member 40 which becomes abutted against one leg of the U-shaped arm 47 when the latter is in the dotted position.

The rubber strip 29 (see Fig. 10) presented by the upper platen 25 may be conveniently carried by a bent-up channel member 29a which is fastened to the upper platen as by the screws 29b passing through the extensions on the bent-up channel 29a. The strip 27 may likewise be held in place by means of a plate 27b at each end held to the platen 25 by two screws 27c.

An alternative form of templet mechanism is shown in Fig. 11 in which the solid templet 20 of Fig. 6 is replaced by a collapsible templet consisting of two parts 120a and 120b. Each part of the templet carries a tapeholder indicated by 122a and 122b respectively. Each templet section is demountably carried on a carriage 133a and 133b respectively, the mounting and demounting of the templet parts being facilitated by the pin-in-slot arrangement indicated in Fig. 11 and in Fig. 14 at 132. The carriages 133a and 133b slide on the bar 124, the friction being reduced by means of rollers shown at 125. The spring 126 forces the two parts of the templet away from each other. By means of the toggle mechanism consisting of the links 128a and 128b and the link 129 pivoted at 130, the two halves of the templet can be brought into the collapsed position shown in Fig. 15. The toggle mechanism is such as to lock the system in this position. The collar is then slipped over as indicated by the dot and dash line in Fig. 15 whereupon the link 129 is released from the locked position by means of the handles 131a and 131b, so that the two halves of the templet spring apart until they are restrained by the collar thereby locating the collar accurately in position on said templet with respect to the tapeholders 122a and 122b and the creasing edges 123a and 123b. The assembled mechanism shown in Figs. 11 to 15 is mounted on the U-shaped arm 47 and is held in the machine of Fig. 8 in exactly the same way as the earlier described mechanism is held. The main differences between the two types of templet mechanism shown are those mentioned below. In the mechanism shown in Fig. 6 the templet is not collapsible. As a result there is no guiding or gauging in the vicinity of the points of the collars so that the gauging is somewhat less secure than in the collapsible form. Also in the non-collapsible form it is not convenient to crease the extremities of the band with the result that these parts of the collar will be subject to the inaccuracies of conventional collars. In the collapsible form shown in Fig. 11 the gauging is more secure and the extremities of the band can readily be creased as indicated in Fig. 5. However, it is not convenient to crease the band part in the central portion of the collar, nor is it convenient to apply foldline-forming means in this same central portion where there is a gap between the two halves of the templet. However, these disadvantages of the collapsible form shown in Fig. 11 are not serious, because the gap involved is not very large and it is located in the part of the collar where any resulting inaccuracies will not be very noticeable. On the other hand, the non-collapsing type of templet shown in Fig. 6 has the advantage of greater simplicity and lower cost of apparatus.

The practice of this invention in the manufacture of collars or the like is regarded as apparent from the foregoing description. Thus in the manufacture of a three-ply one piece collar, the respective plies are assembled in superimposed relation with the lining ply uppermost and with the face ply in the middle. The plies are then run as indicated in Figs. 1 and 3, and thereafter are turned to the position shown in Fig. 4 with the lining on the inside, these operations being carried out in the usual manner. The run and turned collar is then ready to be slipped over the templet, whether the templet is of the one piece or collapsible type, but before doing so the foldline-forming means, e. g., a tape, is placed in the holder therefor that is carried by the templet. When the templet has been internally gauged between the plies of the collar assembly it is moved into position between the platens of the press and when the platens are brought together the lining ply is pressed against the tape and the exerted pressure and the heat of the press cause the tape to adhere to the lining ply due to activation of the adhesive carried thereby. At the same time the applied pressure and heat causes the creases 16 to be formed in the collar plies along the lower margins of the collar band. Thereafter the platens of the press are separated and the templet is moved to the position clear of the platens at which the collar assembly, which now is in the form shown in Fig. 5, can readily be removed therefrom and at which a fresh run and turned collar assembly can be slipped thereover for repeating the described operation.

When the collar is of the "fused" type, e. g., the lining ply carries an adhesive in the form of yarns of adhesive material woven therein or in some other form such as a coating applied thereto, the lining ply becomes fused to one and preferably to both of the plies in contact therewith as is well known in the art. In such case during the fusing operation the tape constituting the foldline-forming means will become permanently secured in position between the lining ply and the back ply, and, because of the action of the machine, the foldline of the collar, as determined by the margin of the tape at or adjacent the collar foldline, will be accurately located in predetermined spaced relationship to the peripheral contours of the foldover or top portion of the collar. Moreover, the foldline-forming means will be accurately spaced in relationship to the creases formed in the collar plies along the lower edge of the collar band. Because the tape is held in place very securely when the collar is subsequently fused, the initial adhesion of the tape to the lining ply prior to fusing need only be temporary and merely sufficient to hold the tape in place until the collar is subsequently fused. In the case of a soft collar that is not subsequently fused, the tape after initial application to the lining ply as has been described hereinabove, may, if desired, be more permanently secured in place as by stitching.

While my invention has been described in connection with preferred apparatus and preferred method, it is to be understood that this has been done merely for the purpose of illustration. Thus the holder or applicator carried by the templet may be in different forms appropriate for the particular kind of foldline-forming means employed. For example, if the foldline-forming means is in the form of a tape or strip which is adapted to become attached throughout to the lining ply, the applicator is normally so positioned that the tape or strip will fall along the collar band with one margin thereof immediately adjacent the desired location of the foldline of the finished collar. On the other hand, in the case of a fused collar a preferred foldline-forming means may consist of an adhesive-carrying tape which also carries resist material along one margin of the tape that is adapted to prevent adhesion of the tape to the lining ply where the resist material is applied. Such foldline-forming means is described more in detail in my aforesaid copending application, and in such case the applicator or holder therefor would normally be carried by the templet so that the resist material carried by the tape will fall along the foldline of the collar, the balance of the tape falling along the collar band. It is also the case, as disclosed in my aforesaid application, that the foldline-forming means may consist essentially of resist material that is applied to the adhesive-bearing lining of a collar of the fused type. For example, the foldline-forming means may be in the form of a cord or a narrow band of tissue paper or a strip of cellophane which is adapted to be made adherent to the lining ply but which is adapted to prevent adhesion of the back ply to the lining ply in the zone where the resist material is applied to the lining ply. In such case, the resist material is normally applied by the applicator or holder so as to fall in a narrow zone extending along the foldline which is desired in the finished collar. More generally the applicator or holder carried by the templet may be of any type suitable for carrying the particular foldline-forming material which in the finished collar affords means for determining the foldline in predetermined and accurate location with reference to the finished collar contours.

While the method and apparatus of this invention has been illustrated in connection with the application of foldline-forming means to the lining ply of a collar assembly that has been run and turned, it is possible, although less desirable, to slip the run and turned collar assembly over the templet in inverted position as compared to that shown and described hereinabove so that the foldline-forming means is applied to the back ply instead of the lining ply.

One of the principal advantages of the practice of this invention lies in the application of foldline-forming means in predetermined spaced relation to the peripheral contours of the foldover or cape portion of a finished collar that are determined by the running stitch. Accordingly, the creasing means associated with the templet may be omitted, although the crease formed by the creasing means is of important practical advantage in affording a guide whereby the collar may be more accurately attached to a shirt in proper relation to the foldline-forming means or whereby, in the case of a detached collar, the lower edge of the collar band may be more accurately finished in proper relation to the foldline-forming means. Alternatively, the crease forming edge protruding from one only of the faces of the templet may be omitted thus producing a crease in the ply or plies lying on one side only of the templet.

More generally the practice of this invention contemplates the carrying of foldline-forming means in a holder or applicator which is adapted to be inserted between the plies of a run and turned collar assembly and the gauging of the holder according to the contours of the foldover portion of the run and turned assembly, the foldline-forming means being affixed to one of the plies of the assembly while the holder is so gauged. For the purpose a novel templet is provided which is adapted to be internally gauged to the contours of the foldover portion of a run and turned collar assembly and which comprises a holder for holding foldline-forming material therein in predetermined spaced relation to the gauging contours of the templet, and which preferably presents as well a crease forming edge protruding from at least one face of the templet so as to fall along and adjacent the margin of the run and turned assembly opposite to the foldover portion when the templet is inserted in gauged relation thereto. For rapid production the templet is carried by a press whereby the run and turned collar assembly may be readily slipped over the templet and subjected to pressure while in gauged relation thereto by means of appropriate pressure exerting members associated with the press and adapted for accomplishing the purposes stated. The details of press mechanisms may be other than illustrated and described hereinabove.

It is apparent from the foregoing that according to this invention articles of apparel in the nature of one piece collars or the like can be rapidly and economically produced using inexpensive equipment, such articles as so produced being accurately dimensioned and provided with foldline-forming means that is accurately located in predetermined spaced relationship with reference to the peripheral contours of the article.

I claim:

1. A templet having a peripheral edge whose contour follows the contour of at least a part of the foldover portion of a collar whereby said templet when inserted between the plies of a run and turned collar assembly is adapted to be gauged according to the contour of the foldover portion of the assembly, said templet having attached to one face thereof holding means comprising an elongated channel adapted to hold foldline-forming material therein in predetermined spaced relation to said peripheral edge for affixation to one of the plies of the assembly when said templet is inserted therebetween.

2. A templet according to claim 1 wherein the bottom of said channel is composed of yieldable resilient material.

3. A templet having a peripheral gauging edge whose contour follows the contour of at least a part of the foldover portion of a collar whereby said templet when inserted between the plies of a run and turned collar assembly is adapted to be gauged according to the contour of the foldover portion of the assembly, said templet having a crease-forming edge attached to and protruding from at least one face of the templet in predetermined spaced relation to said gauging edge and adapted to contact a collar ply of the assembly along and adjacent the margin of the collar assembly opposite to the foldover portion thereof when the templet is inserted in the run and turned collar assembly, and said templet having attached to one face thereof holding means comprising an elongated channel adapted to hold foldline-forming material therein between said gauging edge and said crease-forming edge and in predetermined spaced relation thereto.

4. A templet according to claim 3 wherein a second complementary disposed crease-forming edge is attached to and protrudes from the opposite face of said templet.

5. A collapsible templet adapted for insertion between the run and turned plies of a collar assembly or the like, said templet comprising a first templet portion adapted to be internally gauged to one end of a run and turned collar assembly, a second templet portion adapted to be internally gauged to the opposite end of the assembly, means for slidably mounting said templet portions in essentially the same plane for relative movement toward and away from each other, and means for resiliently urging said templet portions to positions away from each other for gauging said portions with the opposite ends respectively of a run and turned collar assembly, said first and second templet portions having attached thereto first and second holding means respectively adapted to hold therein a foldline-forming material in predetermined spaced relation with respect to the gauging contours of said templet portions and along different portions of a common fold line of the collar assembly.

6. A collapsible templet according to claim 5 which comprises means for releasably securing said templet portions when in adjacent relation against movement away from each other.

7. Apparatus for use in the manufacture of a collar or the like which comprises a templet adapted to be internally gauged between the plies of a run and turned collar assembly according to the contour of the foldover portion of the assembly, said templet having attached to one face thereof a holder for holding a foldline-forming material in predetermined spaced relation to the gauging contours of said templet, and means for pressing one of the plies of the collar assembly against said foldline-forming material when said templet is inserted in said assembly in said gauged relation thereto.

8. Apparatus for use in the manufacture of a one piece collar comprising means for determining the foldline between the band portion and the foldover portion thereof which comprises a templet adapted to be internally gauged between the plies of a run and turned collar assembly according to the contour of the foldover portion of the assembly as determined by the running stitch, said templet comprising holding means comprising an elongated channel adapted to hold therein a foldline-forming material disposed with at least one margin thereof in predetermined spaced relation to the gauging contours of said templet and so as to fall along and immediately adjacent said foldline when said templet is internally gauged as aforesaid in said assembly, and means for pressing one of the plies of said assembly against said foldline-forming material held by said holding means when said templet is inserted in said assembly in said gauged relation thereto.

9. Apparatus according to claim 8 which includes means for applying heat to the work while said ply is pressed against said foldline-forming material.

10. Apparatus for use in the manufacture of a one piece collar or the like comprising a band portion and a foldover portion, said apparatus comprising a templet adapted to be internally gauged between the plies of a run and turned collar assembly according to the contour of the foldover portion of the run and turned assembly, said templet having attached thereto a crease-forming edge protruding from at least one face of said templet so as to fall along and adjacent the lower margin of the band portion of the run and turned assembly when the inserted templet is gauged as aforesaid and a holder on one face thereof for holding foldline-forming material with at least one margin thereof disposed along and immediately adjacent the foldline between the band and foldover portions of the assembly, and means for pressing a ply of said assembly against said crease-forming edge and a ply of said assembly against said foldline-forming material when said templet is inserted in said assembly in said gauged relation thereto.

11. Apparatus for use in the manufacture of a collar or the like which comprises a templet adapted to be internally gauged between the plies of a run and turned collar assembly according to the contours of the foldover portion of the assembly, a press comprising a pair of pressure members, means for effecting relative movement of said pressure members into and away from opposed pressure establishing relation, means for movably mounting said templet for movement between one position between said pressure members for compression therebetween when said pressure members are in pressure establishing relation and a second position clear of said pressure members, a holder attached to one face of said templet comprising a channel adapted to hold foldline-forming material therein, and means presented by and attached to the pressure member opposed to said holder adapted to press a ply of fabric of a run and turned collar assembly carried by said templet against said foldline-forming material held in said holder when said members are in opposed pressure establishing relation with the templet therebetween.

12. Apparatus for use in the manufacture of a collar or the like which comprises a templet adapted to be internally gauged between the plies of a run and turned collar assembly according to the contours of the foldover portion of the assembly, a press comprising a pair of pressure members, means for effecting relative movement of said pressure members into and away from opposed pressure establishing relation, means for movably mounting said templet for movement between one position between said pressure members for compression therebetween when said pressure members are in pressure establishing relation and a second position clear of said members, a crease-forming edge attached to and protruding from at least one face of said templet along a marginal portion of the collar assembly opposite to the foldover portion when said templet is internally gauged with respect to said assembly, and a holder attached to one face of the templet adapted to hold foldline-forming material in predetermined spaced relation to said crease-forming edge and to the gauging contours of the templet, said pressure members presenting yieldable resilient material adapted to oppose and receive said crease-forming edge for creasing a ply of the assembly between said edge and said yieldable resilient material and means for pressing a ply of the assembly against foldline-forming material held in said holder whereby a ply of the assembly is creased and a ply of the assembly is pressed against said foldline-forming material when said members are moved into pressure establishing relation with said templet and a gauged collar assembly carried thereby therebetween.

13. Apparatus according to claim 12 wherein said holder comprises a channel the bottom of which is composed of yieldable resilient material.

14. Apparatus according to claim 12 wherein said templet has attached thereto a second complementary disposed crease-forming edge protruding from the opposite face of the templet and wherein each of said pressure members presents yieldable resilient material adapted to oppose and receive the respective crease-forming edges presented by the templet.

15. In a method of making a collar wherein the collar plies are cut to appropriate shape to provide the foldover portion and at least part of the band portion of the finished collar, the collar plies are assembled in superposed relation, are run along and adjacent the margin of the foldover portion and the so-run plies are turned along the running stitch, the steps comprising inserting between the plies of the run and turned assembly a gauging member and a foldline-forming material adapted to determine the foldline between the band and foldover portions of the collar while said foldline-forming material is held fixed in predetermined spaced relation to a gauging edge of said member, gauging the location of the inserted foldline-forming material according to the contour of the foldover portion of the run and turned assembly by disposing said gauging edge of said member in gauged abutting relation to an internal contour of said foldover portion of the run and turned assembly while said foldline-forming material is held fixed in said predetermined spaced relation to said gauging edge, affixing said foldline-forming material to one of the plies of the assembly while it is held in said gauged relation, and withdrawing said inserted member from the run and turned assembly leaving said foldline-forming material so-affixed to said ply.

16. In a method of making a collar according to claim 15, the steps of applying heat and pressure whereby the affixation of said foldline-forming material to said ply is promoted by externally applied heat and pressure for pressing said ply while under the influence of said heat against said foldline-forming material.

17. A collapsible templet adapted for insertion between the plies of a collar assembly which has been stitched along the margins of the foldover portion thereof, said templet comprising a first templet portion adapted to be internally gauged to one end of the stitched assembly, a second templet portion adapted to be internally gauged to the opposite end of the assembly, carrier bar mounting means for slidably mounting said templet portions in essentially the same plane for relative movement toward and away from each other along said carrier bar, spring means which imposes resiliently applied force to said templet portions in the direction of the line of travel of said templet portions along said carrier bar for urging sliding movement of said templet portions away from each other along said carrier bar, stop means in secured relation to said carrier bar and coacting with said templet portions in their line of travel along said carrier bar for limiting said movement of said templet portions away from each other under the influence of said spring means, means operatively connected to said templet portions for effecting sliding movement of said templet portions toward each other along said carrier bar into adjacent position against said resiliently applied force imposed by said spring means, and readily releasable holding means for holding said templet portions in said adjacent position.

BENJAMIN LIEBOWITZ.

References Cited in the file of this patent

UNITED STATES PATENTS

| Number | Name | Date |
| --- | --- | --- |
| 1,619,939 | Kaplan et al. | Mar. 8, 1927 |
| 1,902,330 | Kaplan | Mar. 21, 1933 |
| 2,471,203 | Eddy | May 24, 1949 |